(12) United States Patent
Lo

(10) Patent No.: US 6,418,018 B1
(45) Date of Patent: Jul. 9, 2002

(54) HEAT REMOVAL SYSTEM

(75) Inventor: Wei Ta Lo, Shenzhen (CN)

(73) Assignee: Foxconn Precision Components Co., Ltd., Taipei Hsien (TW)

( * ) Notice: Subject to any disclaimer, the term of this patent is extended or adjusted under 35 U.S.C. 154(b) by 0 days.

(21) Appl. No.: 09/746,595

(22) Filed: Dec. 21, 2000

(51) Int. Cl.[7] ................................................ H05K 7/20
(52) U.S. Cl. ..................... 361/700; 307/150; 361/697; 363/141
(58) Field of Search ............................... 174/16.3, 15.2; 454/184; 62/259.2; 312/236; 165/80.3, 104.33, 185; 361/687, 695, 697, 698, 699, 700, 717–719; 257/714, 722; 363/141, 144; 307/147, 150

(56) References Cited

U.S. PATENT DOCUMENTS

| | | | | | |
|---|---|---|---|---|---|
| 5,339,214 A | * | 8/1994 | Nelson | ......................... | 361/695 |
| 5,917,699 A | * | 6/1999 | Hung et al. | .................. | 361/697 |
| 5,943,220 A | * | 8/1999 | Shikata et al. | ............... | 361/818 |
| 5,959,837 A | * | 9/1999 | Yu | ............................... | 361/697 |
| 6,094,345 A | * | 7/2000 | Diemunsch | .................. | 361/695 |
| 6,122,169 A | * | 9/2000 | Liu et al. | ...................... | 361/700 |
| 6,137,681 A | * | 10/2000 | Lu | .............................. | 361/697 |
| 6,152,213 A | * | 11/2000 | Suzuki | .................. | 165/104.33 |
| 6,181,556 B1 | * | 1/2001 | Allman | ......................... | 361/690 |
| 6,226,178 B1 | * | 5/2001 | Broder et al. | ................ | 361/687 |

\* cited by examiner

*Primary Examiner*—Gerald Tolin
(74) *Attorney, Agent, or Firm*—Wei Te Chung

(57) ABSTRACT

A heat removal system of the present invention includes a fan (30) of a power supply (20), a heat sink (50) mounted to the fan, and a heat pipe (60) connecting the heat sink to a CPU (24). The heat sink includes a cylindrical base (52) and a plurality of radial fins (54) around the base. Four bolts (40) attach the heat sink and the fan to the power supply. A central bore (58) is defined in the base of the heat sink, for receiving one end of the heat pipe. The other end of the heat pipe is attached to a top surface of the CPU. Heat generated by the CPU is thereby conducted to the heat sink via the heat pipe, and then dissipated outside of a computer enclosure by forced convection of the fan.

4 Claims, 2 Drawing Sheets

HEAT REMOVAL SYSTEM

BACKGROUND OF THE INVENTION

1. Field of the Invention

The present invention relates to a heat removal system of a computer, and in particular to a heat removal system in which a CPU and a power supply share a fan.

2. Related Art

Many electronic devices, such as Central Processing Units (CPUs), generate large amounts of heat during operation. This deteriorates their operational stability. Typically, a heat sink is attached to an outer surface of the CPU to facilitate removal of heat therefrom. A fan is often attached to the heat sink to provide forced convection. However, contemporary CPUs are performing tasks faster and faster, thus generating more and more heat. Heat sinks and fans are being made larger and larger along with this trend. The weights of such heat sinks and fans are increasing accordingly. A clip which fastens a heavy heat sink to a CPU socket mounted on a mother board has limited strength. Thus when a computer sustains shock during normal operation, the heat sink may be dislodged from the CPU. Even if the clip has sufficient strength, the socket may break away from the mother board under the weight of the heat sink.

Therefore, an improved heat removal system which overcomes the above-mentioned problems is desired.

SUMMARY OF THE INVENTION

Accordingly, an object of the present invention is to provide a heat removal system which does not require attachment of a heat sink directly onto a heat-generating electronic device.

Another object of the present invention is to provide a heat removal system which allows a fan to cool more than one heat-generating electronic device.

A further object of the present invention is to provide a heat removal system which efficiently removes heat from electronic devices.

To achieve the above-mentioned objects, a heat removal system of the present invention comprises a fan of a power supply, a heat sink mounted to the fan, and a heat pipe connecting the heat sink to a CPU. The heat sink comprises a cylindrical base and a plurality of radial fins around the base. Four bolts attach the heat sink and the fan to the power supply. A central bore is defined in the base of the heat sink, for receiving one end of the heat pipe. The other end of the heat pipe is attached to a top surface of the CPU. Heat generated by the CPU is thereby conducted to the heat sink via the heat pipe, and then dissipated outside of a computer enclosure by forced convection of the fan.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
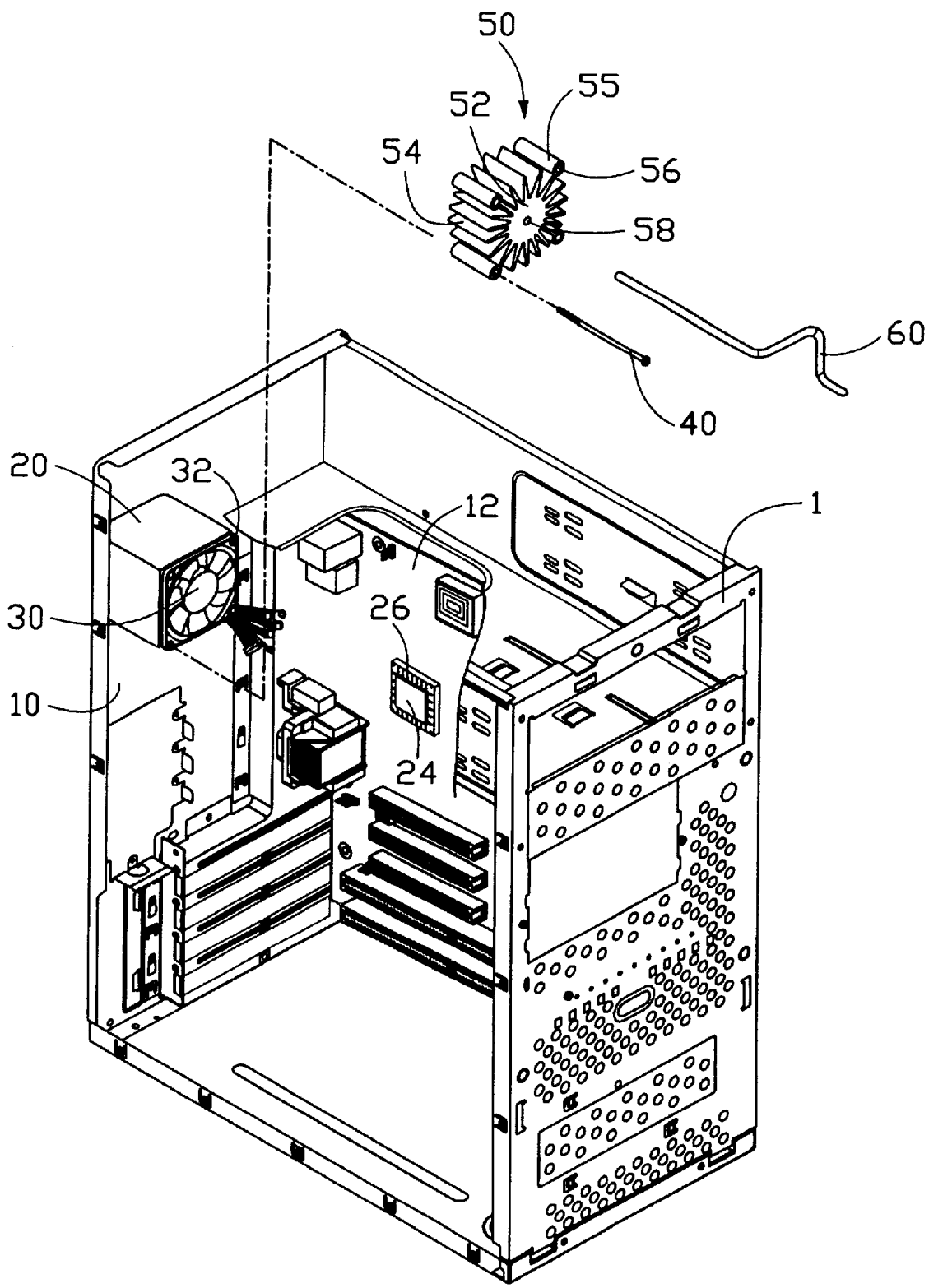
FIG. 1 is an exploded view of a power supply with a fan, a heat sink, and a heat pipe in accordance with the present invention, together with a computer enclosure.

Referring to FIG. 1, a heat removal system of the present invention includes a fan 30 of a power supply 20, a heat sink 50, and a heat pipe 60.

The power supply 20 is attached to a rear panel 10 of a computer enclosure 1. An outflow opening (not labeled) of the power supply 20 communicates with the rear panel 10, for allowing air to pass out of the power supply into airspace outside the computer enclosure 1. The power supply 20 also defines an inflow opening (not labeled) opposite the outflow opening. The fan 30 is attached to an inner face of the power supply 20, such that the inflow opening (not labeled) of the power supply 20 communicates with the fan 30. The fan 30 defines four through apertures 32 at respective corners thereof. The heat sink 50 includes a cylindrical base 52 and a plurality of fins 54 extending radially from a circumferential surface of the base 52. Four sleeves 55 are formed at respective ends of four fins 54, corresponding to the four through apertures 32 of the fan 30. A through hole 56 is defined in each sleeve 55. A central bore 58 is defined in the base 52 of the heat sink 50. Bolts 40 secure the heat sink 50 to the fan 30.

The computer enclosure also has a side panel 12. A CPU socket 26 is attached to an inner surface of the side panel 12. A CPU 24 is mounted to the socket 26.

Figure 2:
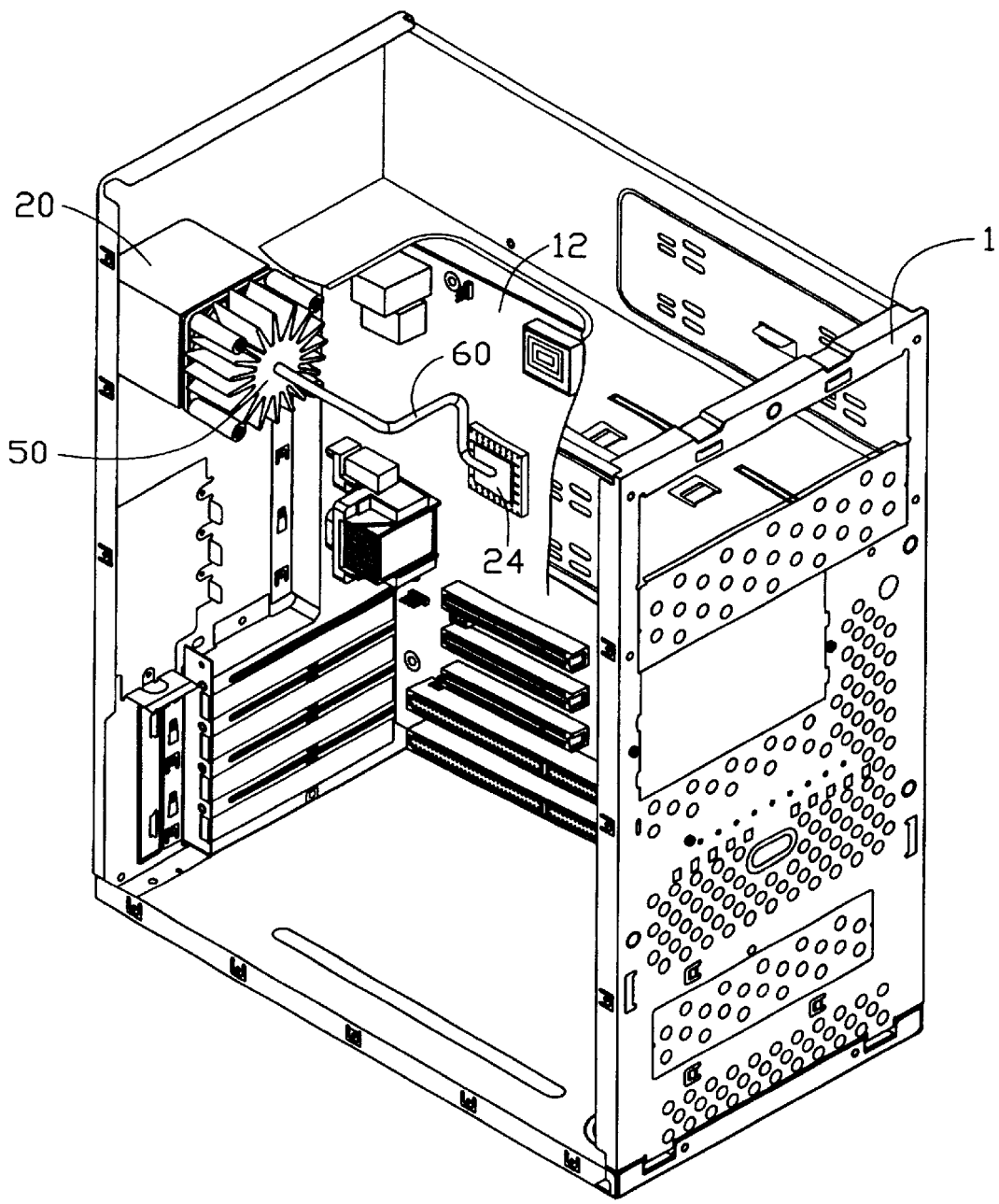
FIG. 2 is an assembled view of FIG. 1.

Referring also to FIG. 2, in assembly, four bolts 40 are extended into the respective through holes 56 of the heat sink 50 and the respective through apertures 32 of the fan 30 to engage with the power supply 20. Thus the heat sink 50 is securely attached to the fan 30. One end of the heat pipe 60 is inserted into the central bore 58 of the heat sink 50, and is retained in the central bore 58 by conventional means such as interferential engagement. The other end of the heat pipe 60 is attached to a top surface of the CPU 24 by conventional means such as using heat conductive glue. Thus heat generated by the CPU 24 is transmitted to the heat sink 30 via the heat pipe 60. The fan 30 of the power supply 20 is preferably high-powered. The fan 30 creates forced convection, whereby heat is removed from the heat sink 50 to outside of the computer enclosure 1.

Alternative means can be employed for engaging the end of the heat pipe 60 with the CPU 24. One such alternative means includes welding or gluing a copper plate to the end of the heat pipe 60. The copper plate is then mounted to the top surface of the CPU 24 by using clips or glue.

It is understood that the invention may be embodied in other forms without departing from the spirit thereof. Thus, the present example and embodiment are to be considered in all respects illustrative and not restrictive, and the invention is not to be limited to the details given herein.

What is claimed is:

1. A heat removal system removing heat from an electronic device, comprising:
    a fan mounted to an inner surface of a power supply to remove heat generated from the power supply;
    a heat sink mounted to the fan; and
    a heat pipe having one end connected to the heat sink and another end connected to the electronic device, whereby heat generated by the electronic device is transmitted to the heat sink through the heat pipe, and then removed from the heat sink by the fan mounted on the power supply.

2. The heat removal system as described in claim 1, wherein the heat sink comprises a base and a plurality of fins around the base.

3. The heat removal system as described in claim 1, wherein the fan defines at least one through aperture therethrough, the heat sink defines at least one through hole therethrough corresponding to the at least one through aperture, and at least one bolt is received in the at least one through aperture and at least one through hole to engage the heat sink and the fan to the power supply.

4. The heat removal system as described in claim 1, wherein a bore is defined in the heat sink receiving the one end of the heat pipe.

* * * * *